United States Patent
Kim (10) Patent No.: US 7,486,482 B2
(45) Date of Patent: Feb. 3, 2009

(54) DISK DRIVE ACTUATOR LATCH APPARATUS WITH SOLENOID COIL OFFSETTING MAGNETISM OF ATTRACTION PART

(75) Inventor: Do-wan Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 11/127,200

(22) Filed: May 12, 2005

(65) Prior Publication Data

US 2005/0275973 A1  Dec. 15, 2005

(30) Foreign Application Priority Data

Jun. 10, 2004  (KR) .................. 10-2004-0042510

(51) Int. Cl.
G11B 5/54 (2006.01)
G11B 21/22 (2006.01)
(52) U.S. Cl. .................. 360/256.2; 360/256.3
(58) Field of Classification Search ............. 360/256.2, 360/256.3
See application file for complete search history.

(56) References Cited

U.S. PATENT DOCUMENTS 5,742,455 A    4/1998  Boutaghou ............. 360/105
5,877,922 A    3/1999  Boutaghou ............. 360/105
2002/0114097 A1* 8/2002  Kim .......................... 360/75
2002/0176211 A1* 11/2002  Kim ..................... 360/256.3
2003/0086209 A1* 5/2003  Kim ..................... 360/256.2

FOREIGN PATENT DOCUMENTS

| EP | 1 308 934 | 5/2003 |
|---|---|---|
| KR | 10-2002-0090056 | 11/2002 |
| KR | 2002-0090056 | 11/2002 |
| KR | 2003-0037568 | 5/2003 |

* cited by examiner

Primary Examiner—Craig A Renner
(74) Attorney, Agent, or Firm—Staas & Halsey LLP (57) ABSTRACT

An actuator latch apparatus for locking a swing arm of a disk drive is described. The apparatus includes a notch provided at an end portion of the swing arm; a latch lever rotatably installed on the base member and including a hook formed to interfere with the notch when the actuator is locked; a first latch pin applying a torque to the latch lever due to a magnetic force of the magnet in a first direction; a second latch pin extending from the latch lever; an attraction part protruded from an edge of the yoke, the attraction part being magnetized by the magnet and adsorbing the second latch pin when the actuator is locked; and a solenoid coil winding around the attraction part and offsetting a magnetism of the attraction part due to a supply of power when the actuator is unlocked.

19 Claims, 7 Drawing Sheets

DISK DRIVE ACTUATOR LATCH APPARATUS WITH SOLENOID COIL OFFSETTING MAGNETISM OF ATTRACTION PART

CROSS-REFERENCE TO RELATED APPLICATION

This application claims the priority of Korean Patent Application No. 2004-0042510, filed on Jun. 10, 2004, in the Korean Intellectual Property Office, the disclosure of which is incorporated herein by reference.

BACKGROUND OF THE INVENTION

1. Field of the Invention

The present invention relates to a disk drive, and more particularly, to an actuator latch apparatus for a disk drive, in which an actuator is locked in a specified position when a disk is not rotating, such that the actuator is prevented from arbitrarily rotating due to an impact to the disk drive.

2. Description of Related Art

A hard disk drive (HDD) is a device for reproducing/recording data from/on a disk using a read/write head. In such an HDD, the read/write head moves to a desired position while moving above a recording surface of a rotating disk by means of an actuator and executes the reproducing/recording functions.

When the HDD is not in operation, that is, when the disk is not rotating, the head is parked off the recording surface of the disk in order to prevent a collision with the recording surface of the disk. Such head parking systems can be classified into a contact start-stop (CSS) system and a ramp loading system. In a CSS system, a parking zone in which data is non-recordable is provided in an inner circumference of the disk and the head is parked in close contact with the parking zone. In the ramp loading system, the head is parked on the ramp, which is located outside the disk.

While the head is parked on the parking zone or the ramp, the actuator may arbitrarily rotate due to an impact to or vibration of the HDD, such that the head is forced out of the parking zone or the ramp and on the recording surface of the disk. In this case, the head may make forceful contact with the recording surface of the disk, such that the head and the recording surface may be damaged. Therefore, when the head is parked on the parking zone or the ramp, the actuator must be locked in a specified position so that it cannot rotate arbitrarily. For this purpose, various kinds of actuator latch apparatuses are provided in the HDD.

Figure 1A:
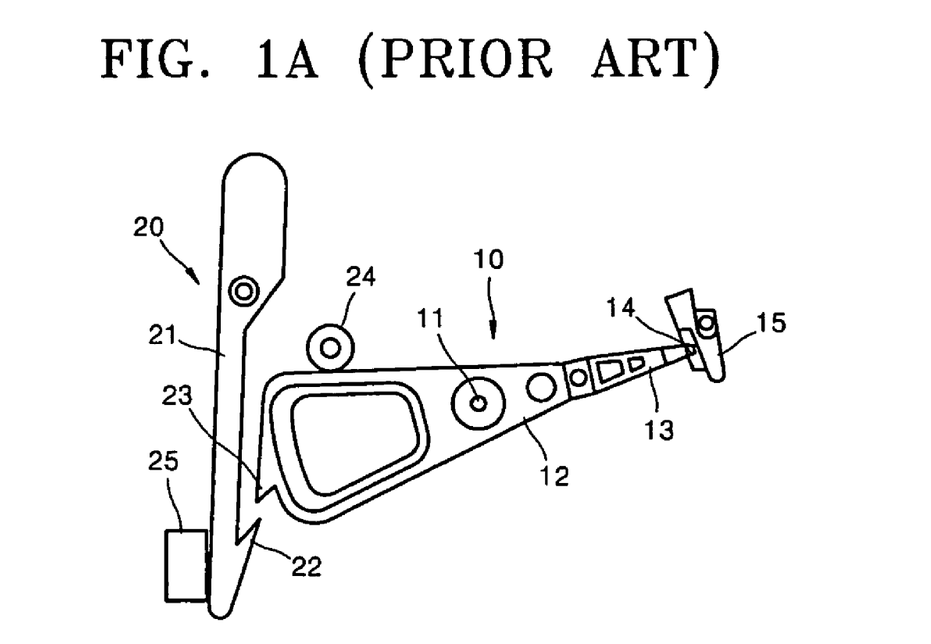
FIGS. 1A through 1C are views illustrating a construction and operation of a single lever type inertial latch apparatus for an HDD according to the conventional art.
Figure 1B:
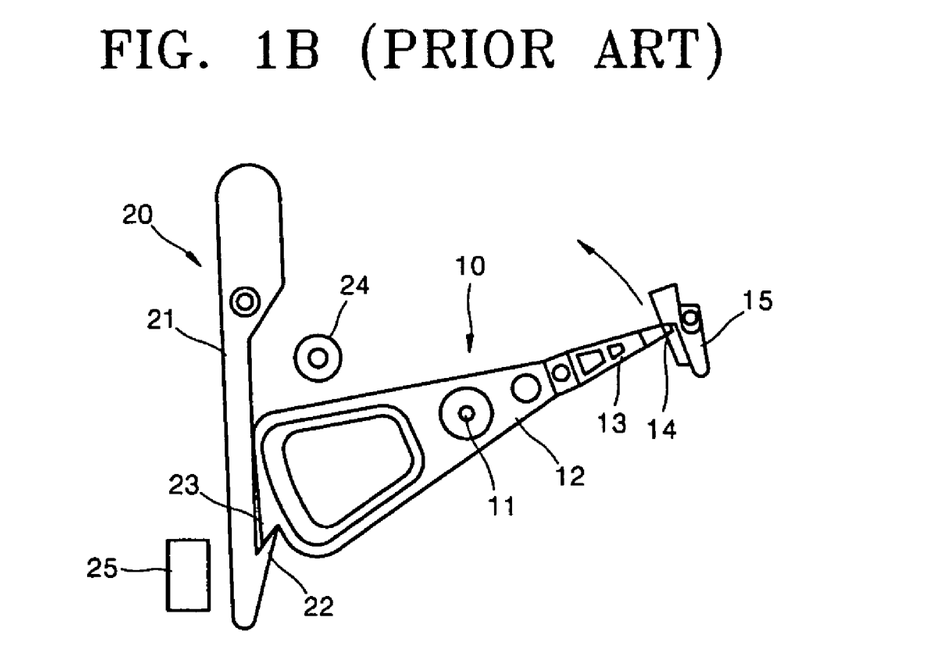
Figure 1C:
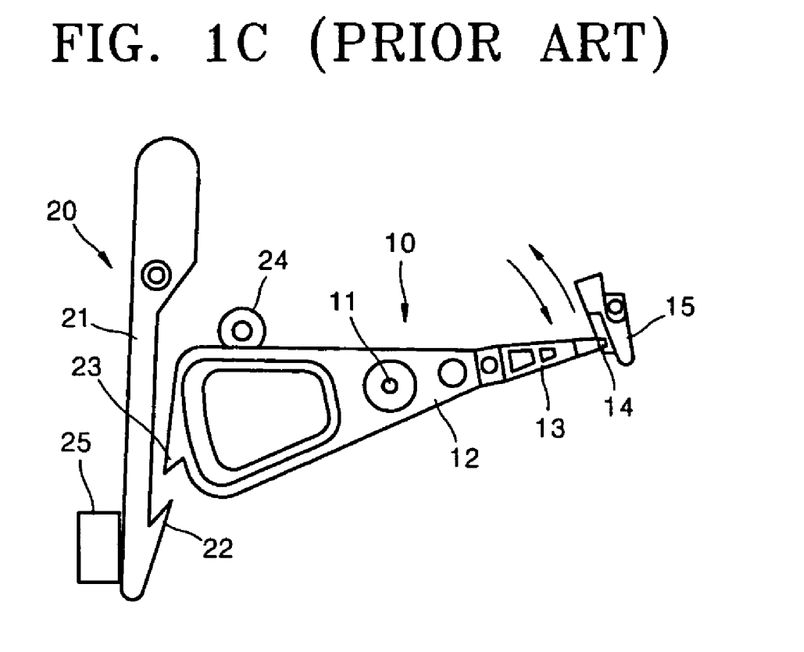

FIGS. 1A through 1C illustrate a single lever type inertial latch apparatus according to the conventional art.

Referring to FIG. 1A, a HDD includes an actuator 10 for moving a read/write head to a specified position on the disk. The actuator 10 includes a swing arm 12 rotatably mounted on a pivot 11, and a suspension 13 installed in one end portion of the swing arm 12 to elastically bias the slider 14 toward a surface of the disk, in which the head is mounted on the slider 14.

The HDD further includes an inertial latch apparatus 20 for locking the actuator 10 when the head is parked in the ramp 15. The inertial latch apparatus 20 includes a latch lever 21 rotating due to inertia, a latch hook 22 provided on a front end of the latch lever 21, a notch 23 provided at the swing arm 12, a crash stop 24 limiting a clockwise rotation relative to the apparatus 20 as depicted in that figure of the swing arm 12, and a latch stop 25 limiting a clockwise rotation of the latch lever 21.

According to the conventional inertial latch apparatus 20, as shown in FIG. 1B, when a rotational force impacts the HDD in a clockwise direction relative to the apparatus 20 as depicted in that figure, the swing arm 12 and the latch lever 21 rotate in a counterclockwise direction due to inertia. Thus, the latch hook 22 is caught by the notch 23, such that the swing arm 12 cannot rotate further. Conversely, as shown in FIG. 1C, when a rotational force impacts the HDD in a counterclockwise direction relative to the apparatus 20 as depicted in that figure, the swing arm 12 and the latch lever 21 rotate in a clockwise direction due to inertia. At first, the swing arm 12 rotates in a clockwise direction, but it collides with the crash stop 24 with a reaction, resulting in the swing arm 12 rotating in a counterclockwise direction. The latch lever 21 collides with the latch stop 25 with a reaction, resulting in the latch lever 21 rotating in a counterclockwise direction. The latch hook 22 is engaged with the notch 23, thereby locking the actuator 10.

Such a single lever type inertial latch apparatus 20 operates correctly when the swing arm 12 of the actuator 10 rotates in a counterclockwise direction due to a clockwise rotational force impacted to the HDD. However, when a rotational force impacts the HDD in a counterclockwise direction, both the swing arm 12 and the latch lever 21 rebound, such that the latch hook 22 and the notch 23 are locked to each other. In this case, if the rebounding timing of the swing arm 12 and the latch lever 21 do not match correctly, the notch 23 is not locked to the latch hook 22. As a result, the actuator 10 is not locked. In other words, the conventional art inertial latch apparatus has a drawback in that a locking reliability of the actuator 10 cannot be guaranteed.

Figure 2A:
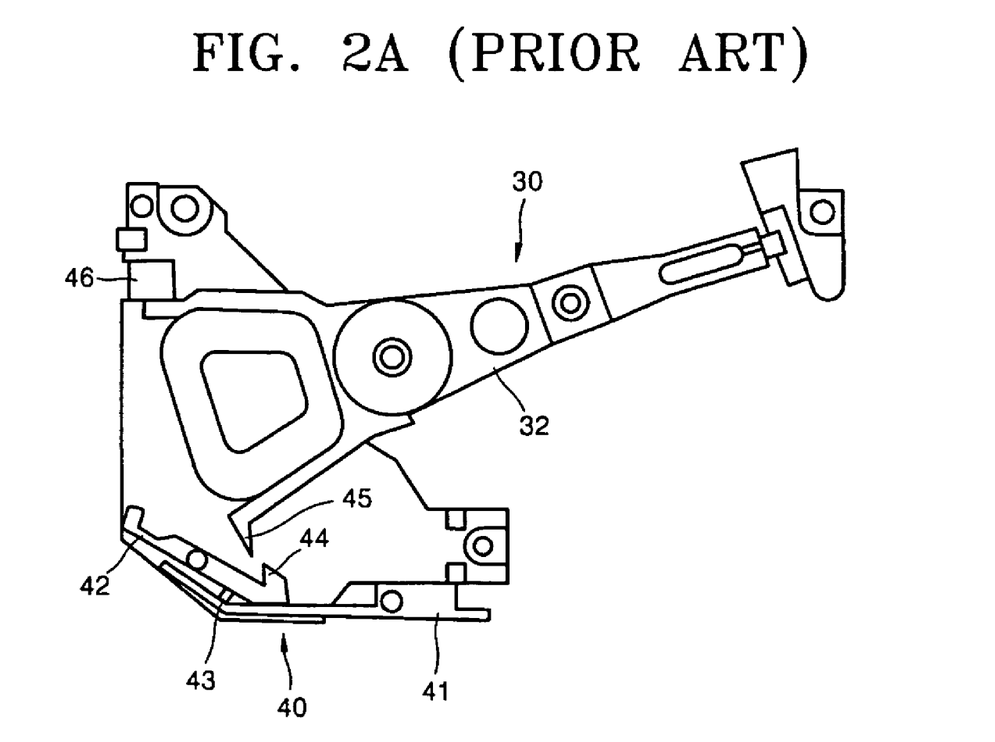
FIGS. 2A through 2C are views illustrating a construction and operation of a dual lever type inertial latch apparatus according to the conventional art.
Figure 2B:
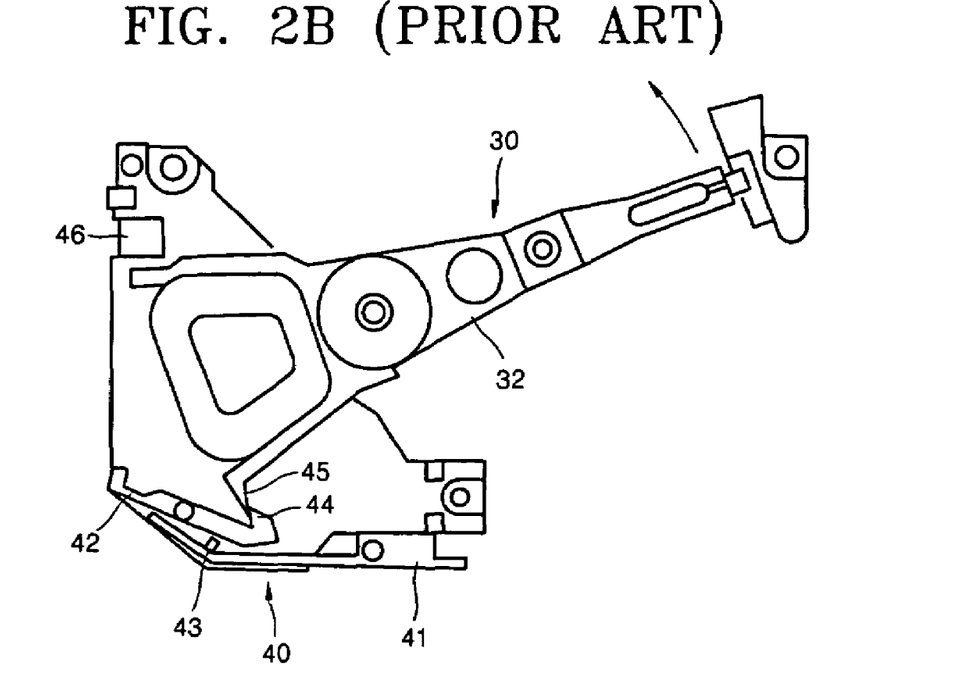
Figure 2C:
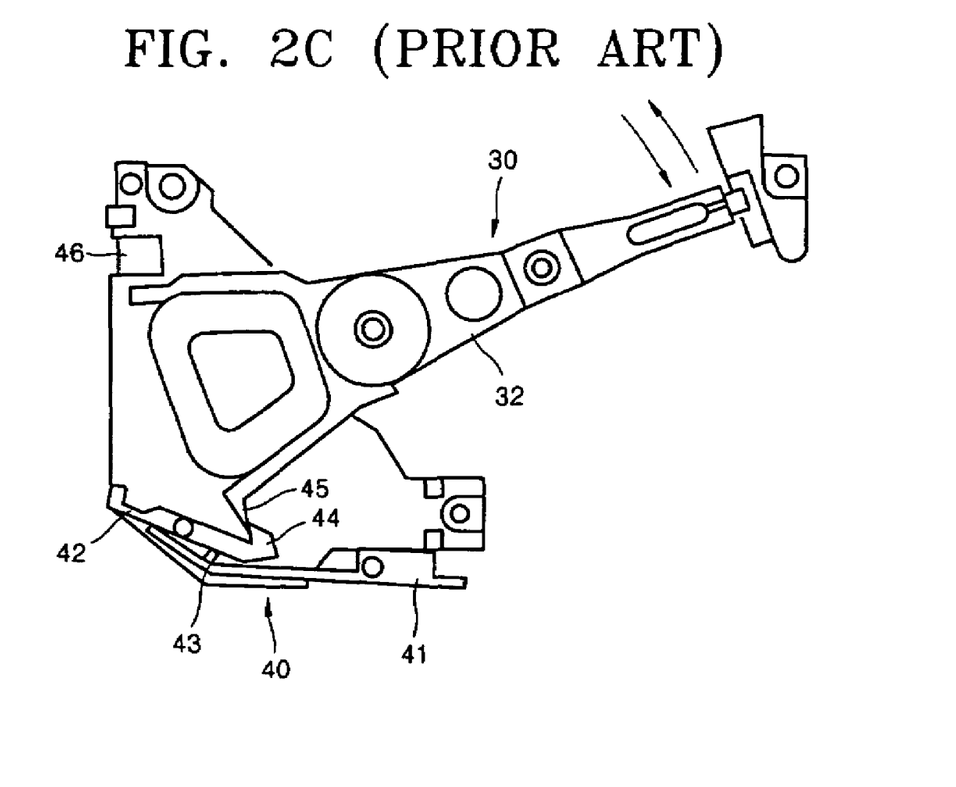

FIGS. 2A through 2C illustrate a dual lever type inertial latch apparatus, which is an improvement of the single lever type inertial latch apparatus.

Referring to FIG. 2A, an inertial latch apparatus 40 for locking an actuator 30 includes two latch levers 41 and 42 rotating due to inertia, a latch pin 43 provided at the first latch lever 41, a latch hook 44 provided at the second latch lever 42, a notch 45 provided at a swing arm 32 of the actuator 30, and a crash stop 46 limiting a clockwise rotation of the swing arm 32.

According to the dual lever type inertial latch apparatus 40, when a rotational force impacts an HDD in a clockwise direction relative to the apparatus 40 as depicted in that figure, the swing arm 32 and the first and second latch levers 41 and 42 rotate in a counterclockwise direction relative to the apparatus 40 as depicted in that figure due to inertia, as shown in FIG. 2B. Therefore, the latch hook 44 is locked to the notch 45, such that the swing arm 32 does not rotate further. On the contrary, as shown in FIG. 2C, when a rotational force impacts an HDD in a counterclockwise direction relative to the apparatus 40 as depicted in that figure, the swing arm 32 and the first latch lever 41 rotate in a clockwise direction due to inertia. At first, the swing arm 32 rotates in a clockwise direction relative to the apparatus 40 as depicted in that figure, but it collides with the crash stop 46 with a reaction, resulting in the swing arm 32 rotating in a counterclockwise direction. The first latch lever 41 rotates in a clockwise direction and the latch pin 43 causes the second latch lever 42 to rotate in a counterclockwise direction. The latch hook 44 of the second latch lever 42 interferes the notch 45 such that a counterclockwise rotation of the swing arm 32 is limited.

The dual lever type inertial latch apparatus 40 operates stably with respect to the rotational force impacting the HDD in the clockwise and counterclockwise directions. However, since the dual lever type inertial latch apparatus 40 requires two latch levers 41 and 42, its structure is complex and its size is large, such that it occupies a large area. Also, a manufacturing cost is increased and much time is necessary to assemble it. Therefore, the dual lever type inertial latch apparatus 40 is difficult to apply to a small-sized mobile disk drive.

The above-described conventional inertial latch apparatuses 20 and 40 operate with respect to a relatively strong rotational force enough to rotate the latch lever. That is, when a relatively weak impact or vibration is applied to the HDD, the latch lever operating due to inertia does not rotate, such that the actuator is not locked but rotates arbitrarily. Therefore, a locking reliability of the actuator cannot be guaranteed when a weak impact is applied to the HDD.

BRIEF SUMMARY

An aspect of the present invention provides an actuator latch apparatus having a simplified structure, in which an actuator can be locked more stably and reliably by a single latch lever, which is operated by a magnetic force and solenoid.

According to an aspect of the present invention, there is provided an actuator latch apparatus for locking, when an operation of a disk drive is stopped, an actuator including: a swing arm rotatably mounted on a base member; a VCM coil coupled to one end portion of the swing arm; a magnet arranged to face the VCM coil; and a yoke for supporting the magnet. The actuator latch apparatus includes: a notch provided at an end portion of the swing arm; a latch lever rotatably installed on the base member and including a hook formed to interfere with the notch when the actuator is locked; a first latch pin applying a torque to the latch lever due to a magnetic force of the magnet in a first direction; a second latch pin extending from the latch lever; an attraction part protruded from an edge of the yoke, the attraction part being magnetized by the magnet and attracting the second latch pin when the actuator is locked; and a solenoid coil winding around the attraction part and offsetting a magnetism of the attraction part due to a supply of power when the actuator is unlocked.

When the actuator is locked, the latch lever may come into the swing arm rotating a first direction and thus rotates in a second direction opposite to the first direction, such that the second latch pin is adsorbed into the attraction part. When the actuator is unlocked, the latch lever may rotate in the first direction due to the offset of the magnetism of the attraction part by the solenoid coil and the torque applied by the first latch pin, such that the rotation of the swing arm in the second direction is not interfered.

Thee latch arm may be made of non-magnetic material, and the first and second latch pins may be made of magnetic material.

The notch may extend from one end portion of the swing arm.

The yoke may include an upper yoke arranged at an upper portion of the VCM coil and a lower yoke arranged at a lower portion thereof, and the attraction part may protrude from an edge of the upper yoke and include a bent portion extending downwards.

The actuator latch apparatus may further include a connector provided between the attraction part and the base member so as to connect the solenoid coil and a power supply circuit. In this case, the power supply circuit may be on a printed circuit board disposed below the base member, the base member may have a through hole, and the connector may have a lead line connecting the power supply circuit and both sides of the solenoid coil via the through hole.

The actuator latch apparatus may further include a damper interposed between the connector and the base member.

The actuator latch apparatus may further include a protrusion part protruded at an edge of the magnet toward the latch lever. Also, the actuator latch apparatus may further include a third latch pin provided at one end portion of the swing arm so as to apply a torque to the swing arm in a first direction due to a magnetic force of the protrusion part. In this case, the third latch pin may be made of magnetic material.

The actuator latch apparatus may further include a crash stop for limiting the swing arm rotating in the first direction.

According to the above construction, the actuator can be locked more stably and reliably by a magnetic force of the magnet. Also, the actuator can be unlocked more easily by the solenoid.

According to another embodiment of the present invention, there is provided a latch assembly for locking and unlocking a swing arm, including: a notch at an end of the swing arm; a latch lever being rotatable at a first latch pin proximate to a first end, having a notch receiving portion proximate to a second end thereof, and having a second latch pin extending from the second end; an attraction part which receives a magnetic field; and a solenoid which offsets the received magnetic field when a current is applied thereto. The first latch pin transfers an applied torque to the latch lever to rotate the latch lever to a locked position when the swing arm is to be locked in a locked position, the attraction part receives the magnetic field and attracts the second latch pin when the swing arm is in the locked position, and the current is applied to the solenoid when the swing arm is to be unlocked from the locked position.

According to another embodiment of the present invention, there is provided a hard disk drive including: a swing arm having a notch at an end; a latch assembly locking and unlocking the swing arm, the latch assembly including: a latch lever being rotatable at a first latch pin proximate to a first end, having a notch receiving portion proximate to a second end thereof, and having a second latch pin extending from the second end; an attraction part which receives a magnetic field; and a solenoid which offsets the received magnetic field when a current is applied thereto. The first latch pin transfers an applied torque to the latch lever to rotate the latch lever to a locked position when the swing arm is to be locked in a locked position, the attraction part receives the magnetic field and attracts the second latch pin when the swing arm is in the locked position, and the current is applied to the solenoid when the swing arm is to be unlocked from the locked position.

According to another embodiment of the present invention, there is provided a method of locking and unlocking a swing arm, including: applying a torque to a first latch pin near a first end of a latch lever to rotate a second end of the latch lever opposite the first end toward the swing arm; applying a magnetic field to an attracting part to attract a second latch pin extending from the second end; rotating the swing arm in a first direction so that a notch at an end thereof engages a hook near the second end of the latch lever when the second end is rotated toward the swing arm; and applying a current to a solenoid to offset the magnetic field applied to the attracting part, ending the applying a torque, and rotating the swing arm in a second direction opposite the first direction.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
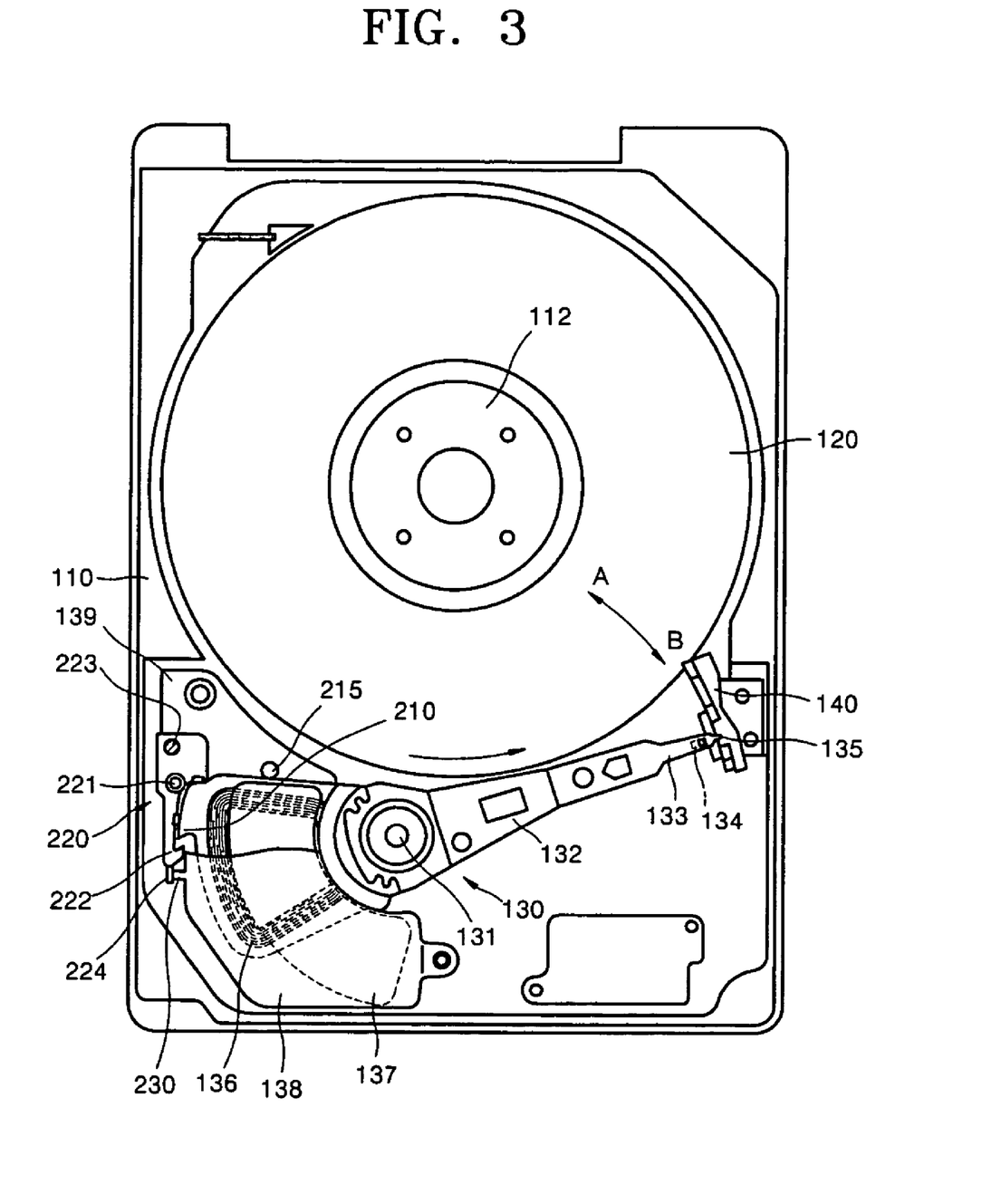
FIG. 3 is a plan view of an HDD having an actuator latch apparatus according to a first embodiment of the present invention.
Figure 4:
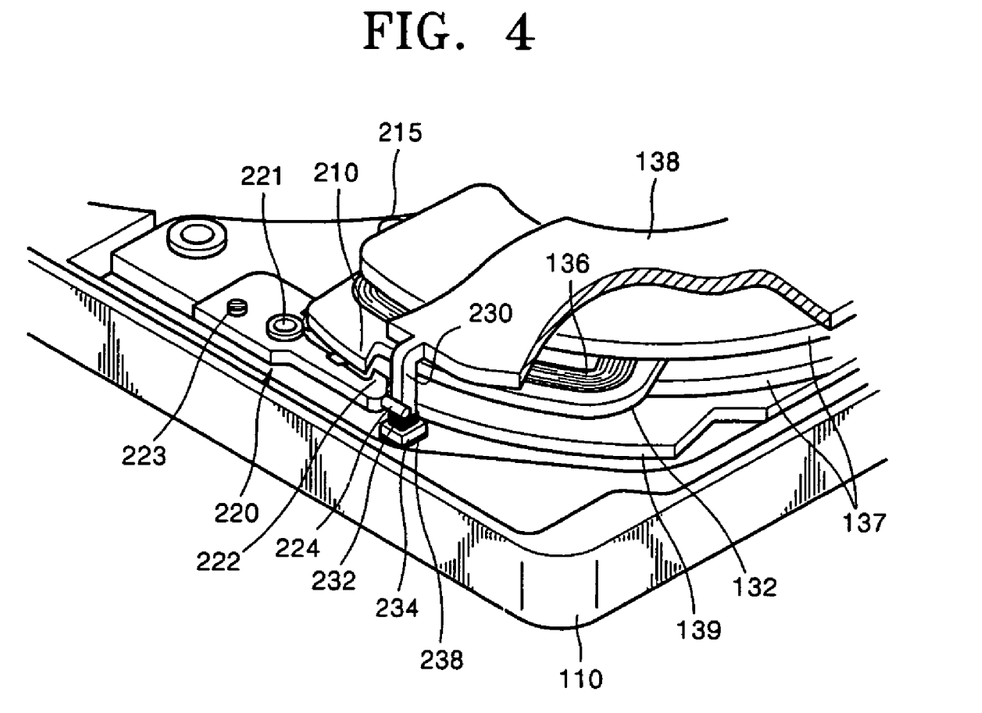
FIG. 4 is an enlarged perspective view of the actuator latch apparatus shown in FIG. 3.
Figure 5:
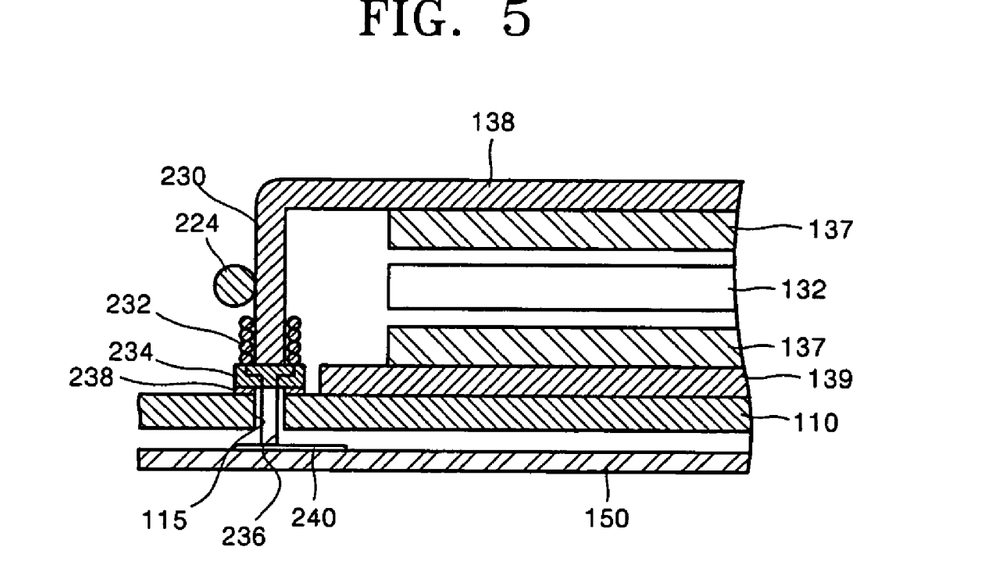
FIG. 5 is a partial sectional view of the actuator latch apparatus shown in FIG. 4.

FIG. 3 is a plan view of an HDD having an actuator latch apparatus according to a first embodiment of the present invention, and FIG. 4 is an enlarged perspective view of the actuator latch apparatus shown in FIG. 3. FIG. 5 is a partial sectional view of the actuator latch apparatus shown in FIG. 4.

Referring to FIGS. 3 and 4, an HDD includes a disk 120 mounted on a spindle motor 112 and an actuator 130 for moving a read/write head to a specified position on the disk 120. Here, the read/write head functions to respectively read and/or write data from and/or to the disk 120. The actuator 130 includes: a swing arm 132 rotatably mounted on a pivot 131 that is installed in a base member 110; a suspension 133 installed in a front end portion of the swing arm 132 to elastically bias a slider 134 toward a surface of the disk 120, in which the head is mounted on the slider 134; and a voice coil motor (VCM) for rotating the swing arm 132.

The VCM includes a VCM coil 136 coupled to a rear end portion of the swing arm 132, a lower yoke 139 disposed at a lower side of the VCM coil 136, an upper yoke 138 disposed at an upper side of the VCM coil 136, and a magnet 137 attached to an upper portion of a lower yoke 139 and a lower portion of the upper yoke 138, facing the VCM coil 136. The magnet 137 may be disposed at either the upper portion or the lower portion of the VCM coil 136.

The VCM is controlled by a servo control system (not shown). The VCM rotates the swing arm 132 in a direction based on Fleming's left hand rule by an interaction between a current inputted to the VCM coil 136 and a magnetic field induced by the magnet 137.

In case of the HDD having a ramp loading system, when the HDD is supplied with power and the disk 120 begins to rotate, the VCM rotates the swing arm 132 in a counterclockwise direction (arrow A), such that the read/write head moves from the ramp 140 toward a recording surface of the disk 120. Conversely, when the power supplied to the disk drive is stopped and the disk 120 is not rotating, the VCM rotates the swing arm 132 in a clockwise direction (arrow B), such that the read/write head escapes from the disk 120. It is to be understood that, as used in the remainder of this detailed description, the terms "clockwise" and "counterclockwise" respectively refer to directions B and A of FIG. 3. It is also to be understood that these directions are relative to the HDD as it is depicted in FIG. 3 and that the described embodiments are not limited to these directions.

The read/write head, when it travels beyond the recording surface of the disk 120, is parked on a ramp 140, which is provided at an outside of the disk 120. Specifically, when the disk 120 is not rotating, the VCM rotates the swing arm 132 in a direction indicated by an arrow B. Thus, an end-tab 135 formed at one end portion of the suspension 133 is parked on the ramp 140.

In case of the HDD having a CSS system, when the HDD is supplied with power and the disk 120 begins to rotate, the VCM rotates the swing arm 132 in a clockwise direction, such that the read/write head moves from a parking zone, which is provided at an inner circumference of the disk 120, to a data zone, which is provided at an outer circumference of the disk 120. Conversely, when the power supplied to the disk drive is cut and the disk 120 is not rotating, the VCM rotates the swing arm 132 in a counterclockwise direction, such that the read/write head moves from the data zone to the parking zone. As a result, the read/write head is settled in the parking zone.

The HDD having the above-described actuator 130 includes the actuator latch apparatus according to the present embodiment. When the operation of the HDD is stopped, the actuator latch apparatus functions to lock the actuator 130 so that the read/write head mounted on the actuator 130 can maintain the parked state. In other words, the actuator latch apparatus prevents the read/write head from escaping from the ramp 140 toward the disk 120 due to an unnecessary rotation of the actuator 130, which may be caused by an impact when the rotation of the disk 120 is stopped.

The actuator latch apparatus according to the present embodiment has a structure that locks the actuator 130 using the magnetic force of the magnet 137. In detail, the actuator latch apparatus according to a first embodiment of the present invention includes: a notch 210 formed at a rear end portion of the swing arm 132; a latch lever 220 rotatably installed in a base member 110 and having a hook 222, a first latch pin 223 and a second latch pin 224; an attraction part 230 formed at an edge of the upper yoke; and a solenoid coil 232 winding around the attraction part 230.

Since the VCM coil 136 is coupled to a rear end portion of the swing arm 132, the rear end portion of the swing arm 132 is generally made using a plastic injection molding. The notch 210 formed at the rear end portion of the swing arm 132 may be formed protruded horizontally from the rear end portion of the swing arm 132 by a plastic injection molding.

The latch lever 220 is rotatably coupled to a shaft 221 installed in the base member 110. The latch lever 220 is made of non-magnetic material, for example a plastic injection molding product, which does not arbitrarily rotate due to the magnetic force of the magnet 137.

The first latch pin 223 is provided at the rear portion of the latch lever 220. The first latch pin 223 may be made of a magnetic material such as, by way of a non-limiting example, steel, in which a magnetic force can operate with the magnet 137. The first latch pin 223 applies a torque to the latch lever 220 in a first direction, for example a clockwise direction. The magnetic force is applied to the first latch pin 223 from the magnet 137 and thus a clockwise torque is applied to the latch lever 220.

The hook 222 is provided at the front end portion of the latch lever 220 and interferes with the notch 210 when the actuator 130 is locked. When the actuator 130 is in a locked state, if the swing arm 132 of the actuator 130 rotates in a second direction, a counterclockwise direction, the notch 210 is caught by the hook 222 of the latch lever 220, thereby preventing the swing arm 132 from rotating arbitrarily.

The second latch pin 224 is provided at the front end portion of the latch lever 220. The second latch pin 224 is installed protruded from the hook 222 in a length direction of the latch lever 220. The second latch pin 224 may be made of a magnetic material such as, by way of a non-limiting example, steel, which is a ferromagnetic material, which can be adsorbed to the attraction part 230 magnetized by the magnet 137. The second latch pin 224 is approached and adsorbed to the attraction part 230 while the latch lever 220 rotates in a counterclockwise direction when an operation of the HDD is stopped.

The attraction part 230 is protruded from an edge of the upper yoke 138 and bent downwards. The attraction part 230 is magnetized by the magnet 137 attached to a bottom of the upper yoke 138. Therefore, when an operation of the HDD is stopped, the second latch pin 224 can be adsorbed more firmly.

The solenoid coil 232 winds around the attraction part 230 and offsets the magnetism of the attraction part 230 when the actuator 130 is unlocked. In more detail, when a current is supplied to the solenoid coil 232 in a direction, a magnetic field is induced around the solenoid coil 232. The direction of the current is determined so that a direction of the magnetic field formed by the solenoid coil 232 can be opposite to that of the magnetic field formed around the attraction part 230 by the magnet 137. The magnetic field formed around the attraction part 230 by the magnet 137 is offset due to the magnetic field formed around the attraction part 230 by the solenoid coil 232. Since the magnetic force of the attraction part 230 adsorbing the second latch pin 224 disappears, the second latch pin 224 can be freely separated from the attraction part 230.

The actuator latch apparatus according to the present embodiment also includes, though optional, a crash stop 215 for limiting a clockwise rotation of the swing arm 132. The crash stop 215 protrudes from the lower yoke 139 by a specified height. When the actuator 130 is in a parked state, the crash stop 215 comes in contact with the rear side portion of the swing arm 132 such that a clockwise rotation of the swing arm 132 is limited.

The actuator latch apparatus adopts a structure that supplies power to the solenoid coil 232. An example of the power supply structure is shown in FIGS. 4 and 5.

Referring to FIGS. 4 and 5, a current is selectively supplied to the solenoid coil 232 through a connector 234. A printed circuit board (PCB) 150 having various driver circuits for driving the HDD is installed below the base member 110. A through hole 115 is formed adjacent to the solenoid coil 232 on the base member 110.

The connector 234 is installed between the attraction part 230 and the base member 110 and electrically connects the solenoid coil 232 and the power supply circuit 240. The connector 234 has a lead line 236 connected to both sides of the solenoid coil 232. The lead line 236 is connected to the power supply circuit 240 through the through hole 115. When the upper yoke 138 is fixed to the base member 110, the attraction part 230 presses the connector 234 downwards. Simultaneously, both sides of the solenoid coil 232 come in contact with the lead line 236, such that they are electrically connected to each other.

A damper 238 may be interposed between the connector 234 and the base member 110. The damper 238 acts as a shock absorber and seals tightly an interior of the HDD.

The connector 234 may have various structures, which are known to those skilled in the art.

An operation of the actuator latch apparatus will now be described with reference to FIGS. 4, 6A and 6B.

Figure 6A:
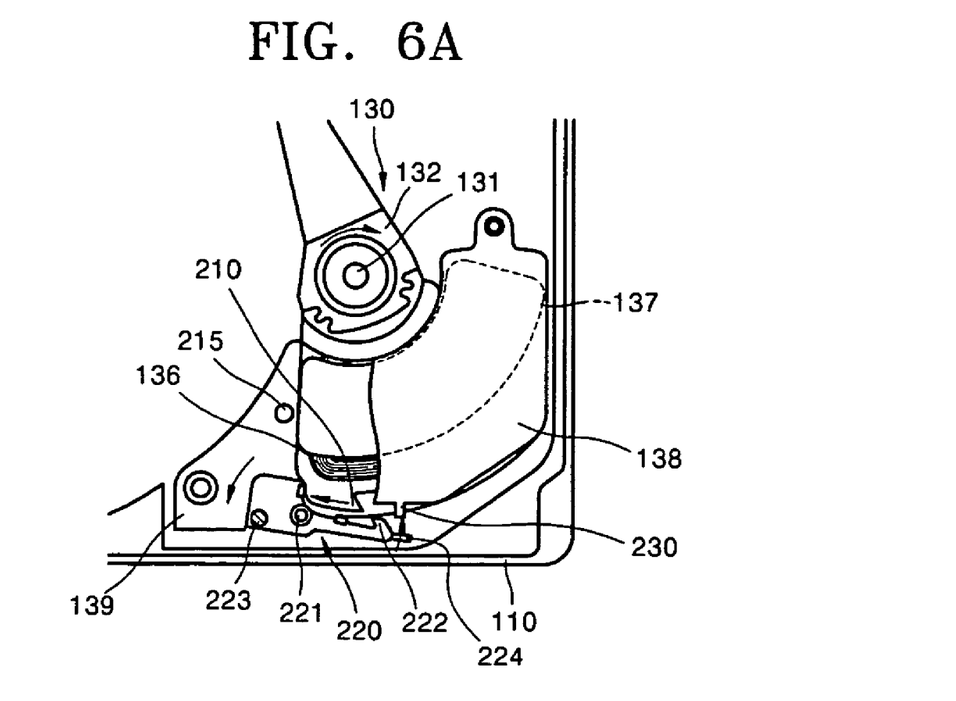
FIG. 6A is a view illustrating a locking operation of the actuator latch apparatus according to an embodiment of the present invention.
Figure 6B:
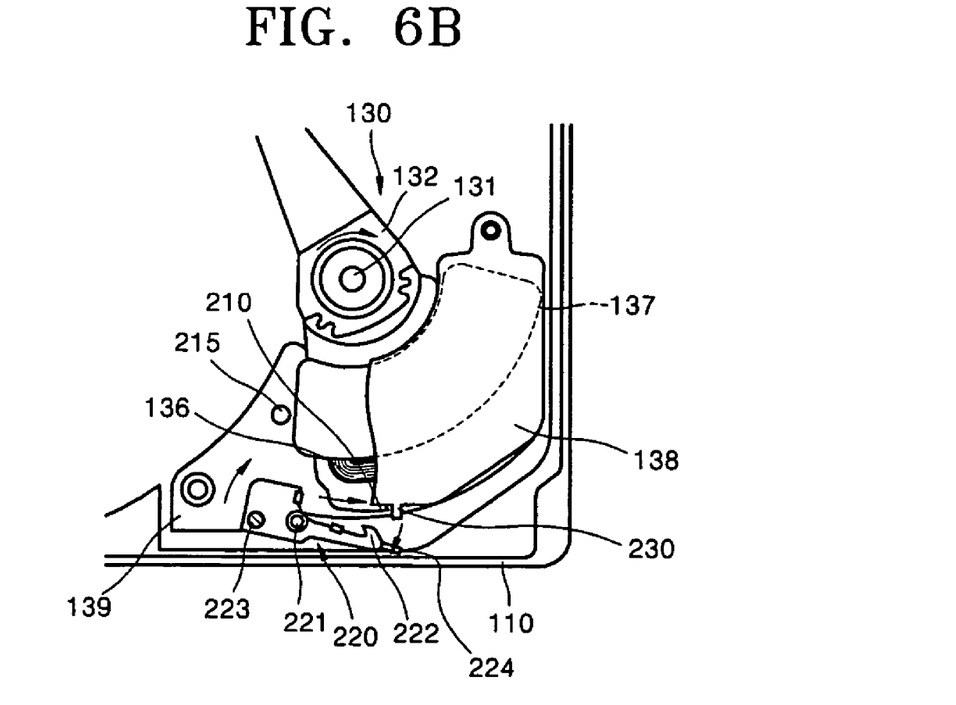
FIG. 6B is a view illustrating a unlocking operation of the actuator latch apparatus according to an embodiment of the present invention.

FIG. 6A is a view illustrating a locking operation of the actuator latch apparatus, and FIG. 6B is a view illustrating an unlocking operation of the actuator latch apparatus.

Referring to FIG. 6A, when an operation of the HDD is stopped and the read/write head is parked on the ramp 140, the VCM rotates the swing arm 132 around the pivot 131 in a clockwise direction. The rear side portion of the swing arm 132 comes into contact with the rear end portion of the latch lever 220. Thus, the latch lever 220 rotates in a counterclockwise direction due to the swing arm 132 rotating in a clockwise direction. When the read/write head reaches the ramp 140, the second latch pin 224 is adsorbed into the attraction part 230 magnetized by the magnet 137.

In this manner, the parking of the read/write head is completed and the locking of the actuator 130 is achieved, as show in FIG. 4. When the read/write head is in a parked state, the swing arm 132 may rotate in a counterclockwise direction due to a strong impact. At this time, since the second latch pin 224 is attracted into the attraction part 230 due to the magnetic force, a clockwise rotation of the latch lever 220 does not occur. Therefore, the notch 210 provided at the rear end portion of the swing arm 132 is caught by the hook 222 of the latch lever 220, so that the swing arm 132 cannot rotate further.

The attraction part 230 provided at the yoke 138 attracts the latch lever 220 due to the magnetic force of the magnet 137, so that the actuator 130 is reliably locked even at a strong impact.

Referring to FIG. 6B, when the HDD is supplied with power, a current is supplied to the solenoid coil 232 in a direction. The magnetism of the attraction part 230 magnetized by the magnet 137 may be offset by the magnetic field induced by the solenoid coil 232. Since the magnetic force of the attraction part 230 adsorbing the second latch pin 224 disappears, the second latch pin 224 can be released from the attraction part 230. At this time, a clockwise torque is operated to the latch lever 220 due to the magnetic force occurring between the first latch pin 223 and the magnet 137. Thus, since the latch lever 220 rotates freely in a clockwise direction, the notch 210 of the swing arm 132 rotating in a counterclockwise direction is not interfered with the hook 222 of the latch lever 220.

As described above, when the HDD begins to operate, the magnetism of the attraction part 230 is offset by the solenoid coil 232, so that the actuator 130 is easily unlocked.

Figure 7:
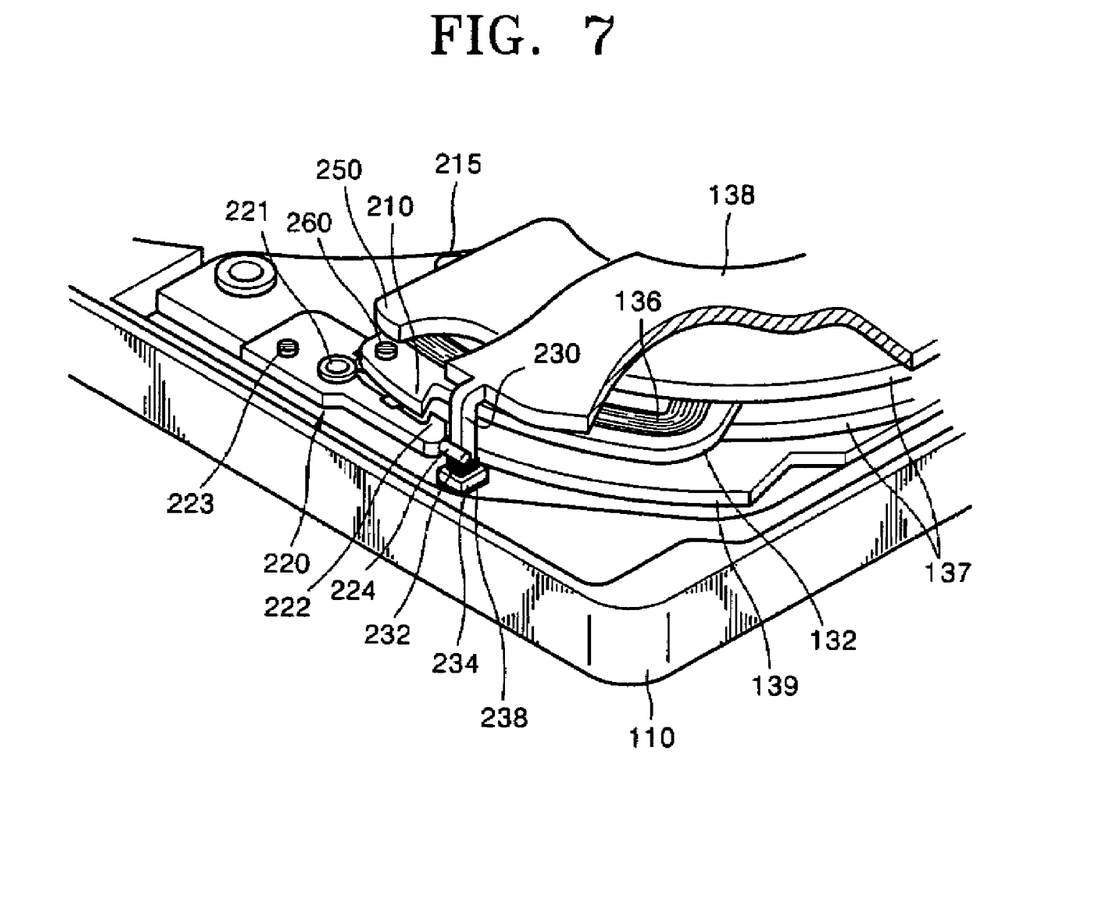
FIG. 7 is a perspective view of an actuator latch apparatus according to a second embodiment of the present invention.

FIG. 7 is a perspective view of an actuator latch apparatus according to a second embodiment of the present invention.

A construction of the second embodiment is similar to that of the first embodiment, except for a protrusion part and a third latch pin. The actuator latch apparatus according to the second embodiment of the present invention will now be described.

Referring to FIG. 7, the actuator latch apparatus includes a protrusion part 250 protruded at the edge of the magnet 137 toward the latch lever 220. Compared with the first embodiment, a distance between the first latch pin 223 and the magnet 137 becomes shorter due to the protrusion part 250. Since a magnetic force from the protrusion part 250 of the magnet 137 is operated stronger to the first latch pin 223, so that a larger clockwise torque is applied to the latch lever 220. When the actuator 130 is unlocked, the latch lever 220 rotates faster in a clockwise direction. Therefore, even when the swing arm 132 rotates fast in a counterclockwise direction, the unlocking operation can be reliably achieved.

A third latch pin 260 is provided at one end portion of the swing arm 132. The third latch pin 260 may be made of a magnetic material such as, by way of a non-limiting example, steel, which is a ferromagnetic material, in which a magnetic force can operate with the protrusion part 250. The third latch pin 260 applies a clockwise torque to the swing arm 132. The magnetic force from the protrusion part 250 is applied to the third latch pin 260 and thus a clockwise torque is applied to the swing arm 132. The clockwise torque applied to the swing arm 132 causes the actuator 130 to be locked with respect to a relatively weak impact and vibration.

According to above-described embodiments of an actuator latch apparatus of the present invention, the attraction part provided at the yoke attracts the latch lever due to the magnetic force of the magnet, such that the actuator is locked stably and reliably with respect to a relatively weak impact and vibration, as well as a strong impact. When the HDD begins to operate, the magnetism of the attraction part is offset by the solenoid. Therefore, the actuator can be easily unlocked.

Also, since the actuator latch apparatus according to the above-describe embodiments of the present invention includes one latch lever and the solenoid coupled to the attraction part of the yoke, an overall structure is simple and its occupied space is small. Therefore, a manufacturing cost is reduced and it is easy to apply to a small-sized mobile disk drive.

Although the embodiments are described in the context of the an actuator latch apparatus applied to an HDD having the ramp loading system, it is to be understood that the present invention can also be applied to an HDD having the CSS system.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A latch assembly for locking and unlocking a swing arm, comprising:
   a notch at an end of the swing arm;
   a latch lever being rotatable at a first latch pin proximate to a first end, having a notch receiving portion proximate to a second end thereof, and having a second latch pin extending from the second end;
   an attraction part that is magnetized by a magnetic field; and
   a solenoid coil that winds around the attraction part,
   wherein, the first latch pin transfers an applied torque to the latch lever via a magnetic force to rotate the latch lever to a locked position when the swing arm is to be locked in a locked position, the attraction part receives the magnetic field and attracts the second latch pin when the swing arm is in the locked position, and a current is applied to the solenoid coil to offset magnetism of the attraction part when the swing arm is to be unlocked from the locked position.

2. The latch assembly of claim 1, wherein the magnetic field and the magnetic force are from one or more magnets.

3. The latch assembly of claim 1, wherein the notch receiving portion is a hook configured to receive at least an edge of the notch.

4. An actuator latch apparatus for locking, when an operation of a disk drive is stopped, an actuator including: a swing arm rotatably mounted on a base member; a VCM coil coupled to one end portion of the swing arm; a magnet arranged to face the VCM coil; and a yoke for supporting the magnet, the actuator latch apparatus comprising:
   a notch provided at an end portion of the swing arm;
   a latch lever rotatably installed on the base member and including a hook formed to interfere with the notch when the actuator is locked;
   a first latch pin applying a torque to the latch lever due to a magnetic force of the magnet in a first direction;
   a second latch pin extending from the latch lever;
   an attraction part protruded from an edge of the yoke, the attraction part being magnetized by the magnet and adsorbing the second latch pin when the actuator is locked; and
   a solenoid coil winding around the attraction part and offsetting a magnetism of the attraction part due to a supply of power when the actuator is unlocked.

5. The actuator latch apparatus of claim 4, wherein, when the actuator is locked, the latch lever comes into the swing arm rotating a first direction and thus rotates in a second direction opposite to the first direction, such that the second latch pin is adsorbed into the attraction part, and
   wherein, when the actuator is unlocked, the latch lever rotates in the first direction due to the offset of the magnetism of the attraction part by the solenoid coil and the torque applied by the first latch pin, such that the rotation of the swing arm in the second direction is not interfered.

6. The actuator latch apparatus of claim 4, wherein the latch lever is made of non-magnetic material.

7. The actuator latch apparatus of claim 4, wherein the first and second latch pins are made of magnetic material.

8. The actuator latch apparatus of claim 4, wherein the notch extends horizontally from the swing arm.

9. The actuator latch apparatus of claim 4, wherein the yoke includes an upper yoke at an upper portion of the VCM coil and a lower yoke at a lower portion thereof, and the attraction part protrudes from an edge of the upper yoke and includes a bent portion extending downwards.

10. The actuator latch apparatus of claim 4, further comprising a connector between the attraction part and the base member so as to connect the solenoid coil and a power supply circuit.

11. The actuator latch apparatus of claim 10, wherein the power supply circuit is on a printed circuit board disposed below the base member, the base member has a through hole, and the connector has a lead line connecting the power supply circuit and both sides of the solenoid coil via the through hole.

12. The actuator latch apparatus of claim 10, further comprising a damper interposed between the connector and the base member.

13. The actuator latch apparatus of claim 4, further comprising a protrusion part protruded at an edge of the magnet toward the latch lever.

14. The actuator latch apparatus of claim 13, further comprising a third latch pin at one end portion of the swing arm so as to apply a torque to the swing arm in a first direction due to a magnetic force of the protrusion part.

15. The actuator latch apparatus of claim 14, wherein the third latch pin is made of magnetic material.

16. The actuator latch apparatus of claim 4, further comprising a crash stop limiting a range of rotation of the swing arm.

17. The actuator latch assembly of claim 4, wherein the hook is at a front end portion of the latch lever, the first latch pin is at a rear end portion of the latch lever, and the second latch pin is at the front end portion.

18. A hard disk drive comprising:
a swing arm having a notch at an end;
a latch assembly locking and unlocking the swing arm, the latch assembly including
a latch lever being rotatable at a first latch pin proximate to a first end, having a notch receiving portion proximate to a second end thereof, and having a second latch pin extending from the second end;
an attraction part which receives a magnetic field; and
a solenoid which offsets the received magnetic field when a current is applied thereto,
wherein, a magnetic force is applied to the first latch pin whereby the first latch pin transfers an applied torque to the latch lever to rotate the latch lever to a locked position when the swing arm is to be locked in a locked position, the attraction part receives the magnetic field and attracts the second latch pin when the swing arm is in the locked position, and the current is applied to the solenoid when the swing arm is to be unlocked from the locked position.

19. A method of locking and unlocking a swing arm, comprising:
applying a torque to a latch lever via a magnetic force applied to a first latch pin located near a first end of the latch lever, the torque applied to rotate a second end of the latch lever, located opposite the first end, toward the swing arm;
applying a magnetic field to an attracting part to attract a second latch pin extending from the second end;
rotating the swing arm in a first direction so that a notch at an end thereof engages a hook near the second end of the latch lever when the second end is rotated toward the swing arm; and
applying a current to a solenoid to offset the magnetic field applied to the attracting part, ending the applying a torque, and rotating the swing arm in a second direction opposite the first direction.

* * * * *